United States Patent [19]

Gongwer

[11] Patent Number: 4,986,174
[45] Date of Patent: Jan. 22, 1991

[54] AUTOMATIC FOOD COOKING MACHINE

[75] Inventor: Dean Gongwer, Wakarusa, Ind.

[73] Assignee: Nelgo Manufacturing, Inc., Wakarusa, Ind.

[21] Appl. No.: 536,498

[22] Filed: Jun. 11, 1990

Related U.S. Application Data

[63] Continuation-in-part of Ser. No. 343,794, Apr. 27, 1989, Pat. No. 4,947,741.

[51] Int. Cl.⁵ .............................................. A47J 37/04
[52] U.S. Cl. .................................... 99/345; 99/386; 99/400; 99/427; 99/443 C; 99/446; 99/477
[58] Field of Search ..................... 99/345–347, 99/386, 389, 391, 400, 401, 402, 427, 443 C, 444–446, 448, 443 R, 477–479, 448

[56] References Cited

U.S. PATENT DOCUMENTS

| | | | |
|---|---|---|---|
| 1,696,613 | 12/1928 | Shroyer | 99/400 |
| 3,448,678 | 6/1969 | Burstein | 99/400 |
| 3,499,380 | 3/1970 | Gongwer | 99/386 |
| 3,823,660 | 7/1974 | Nerthling | 99/443 C |
| 4,023,007 | 5/1977 | Brown | 99/401 |
| 4,167,585 | 9/1979 | Caridis et al. | 99/446 |
| 4,176,589 | 12/1979 | Stuck | 99/389 |
| 4,188,866 | 2/1980 | Baker et al. | 99/446 |
| 4,201,125 | 5/1980 | Ellis | 99/446 |
| 4,244,285 | 1/1981 | Baker | 99/400 |
| 4,453,457 | 6/1984 | Gongwer et al. | 99/345 |

FOREIGN PATENT DOCUMENTS 8505546  12/1985  PCT Int'l Appl. ................. 99/386

Primary Examiner—Timothy F. Simone
Attorney, Agent, or Firm—Todd A. Dawson

[57] ABSTRACT

An automatic food cooker machine having a plurality of food product carriers attached to an endless conveyor. The food carriers are attached and detached from the conveyor at opposite ends of the cooker. A plate is provided between the heat source and conveyor to catch grease and other debris falling from the food products. A plurality of restraining bars extend across the plate in one embodiment to minimize buckling of the plate when heated.

4 Claims, 5 Drawing Sheets

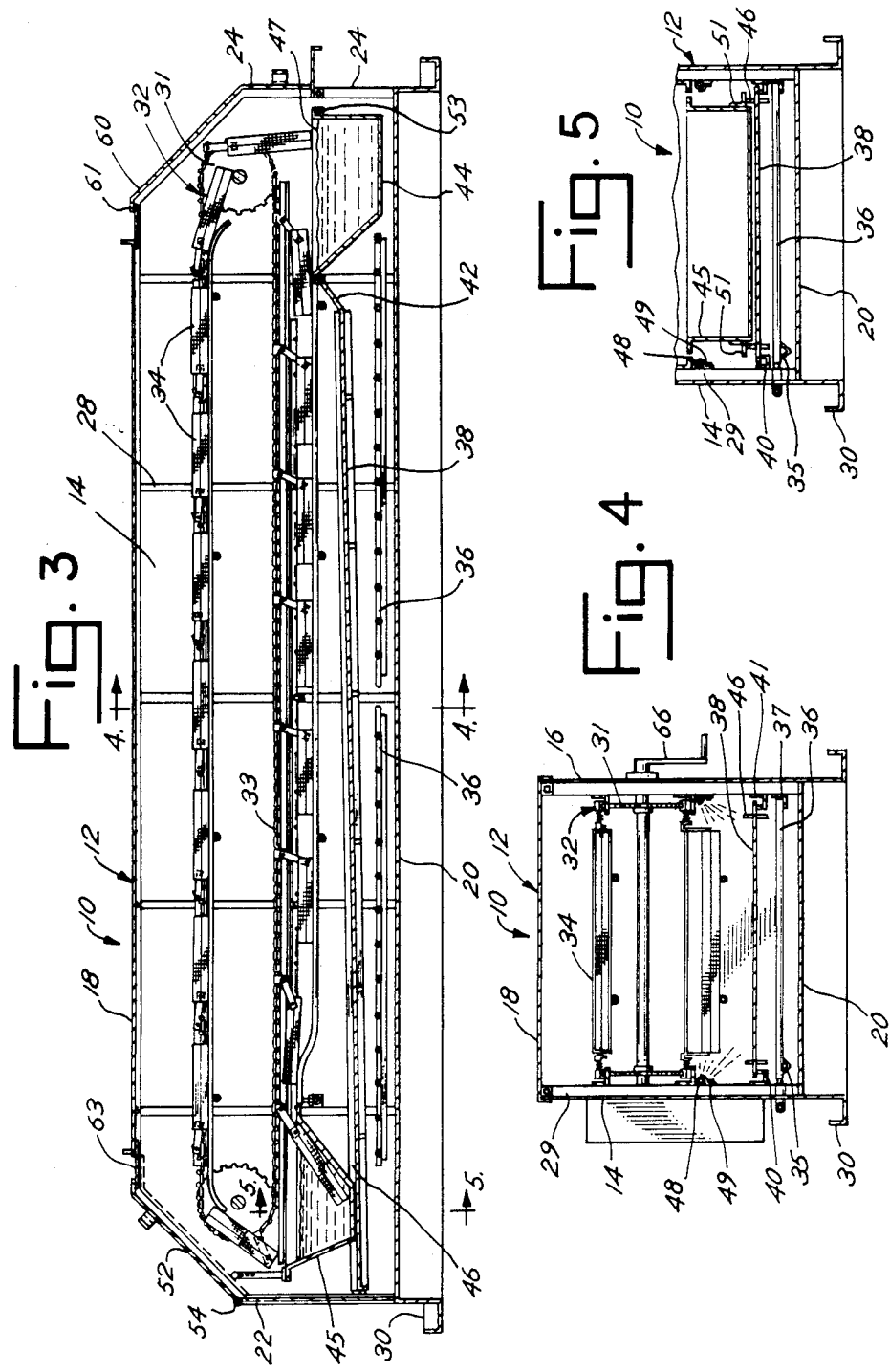

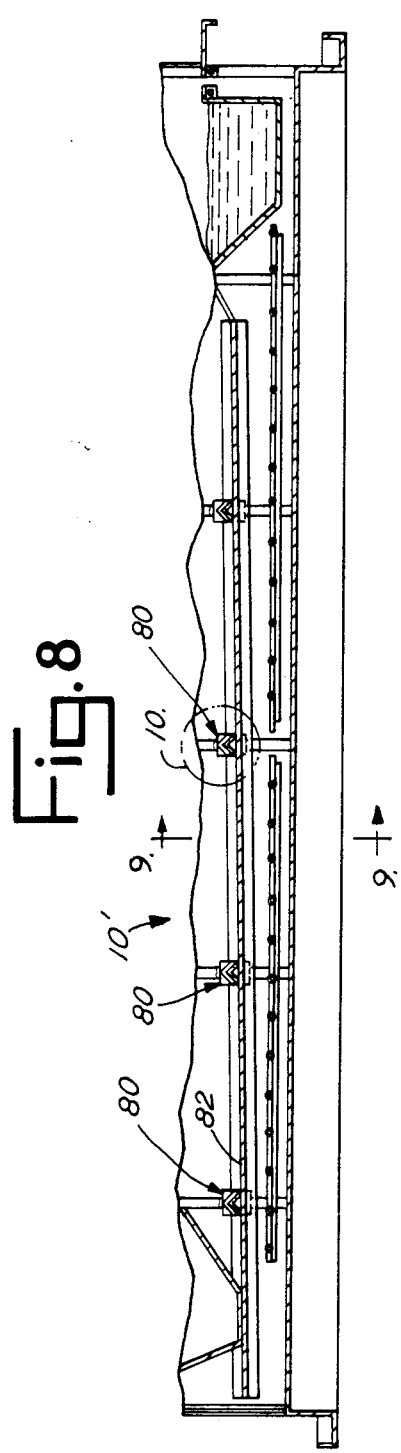
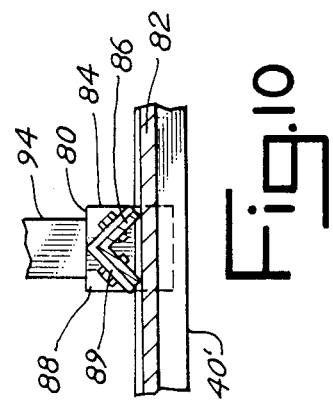
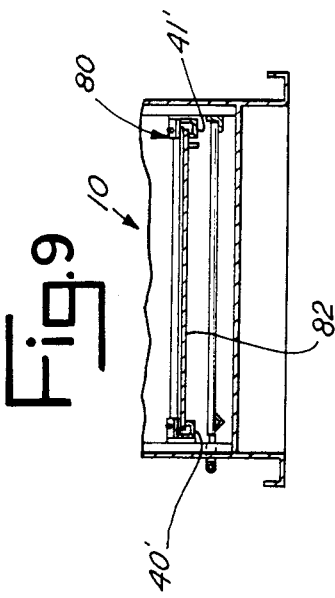

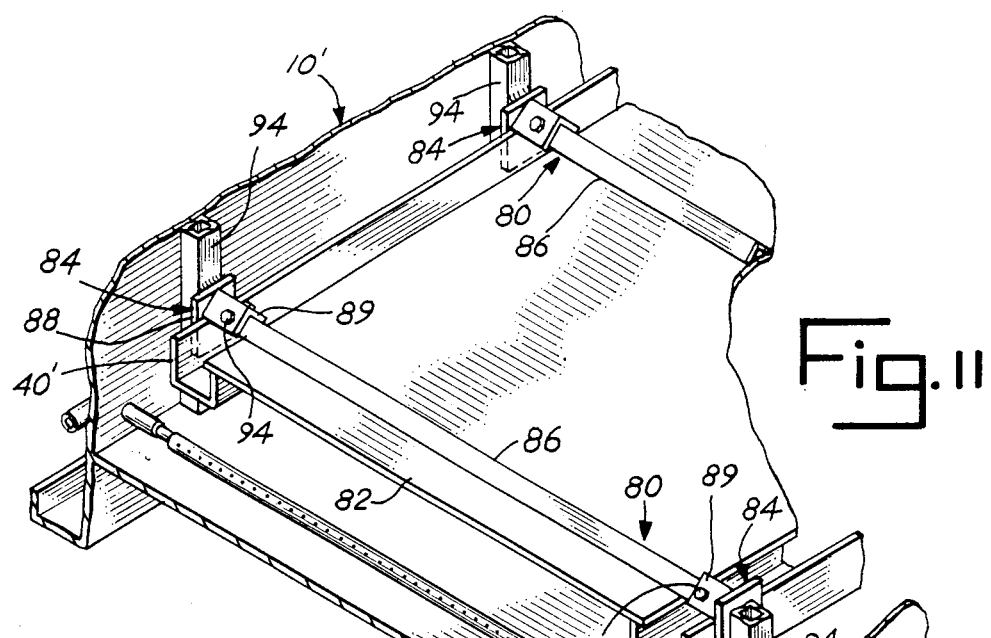
Fig. 11
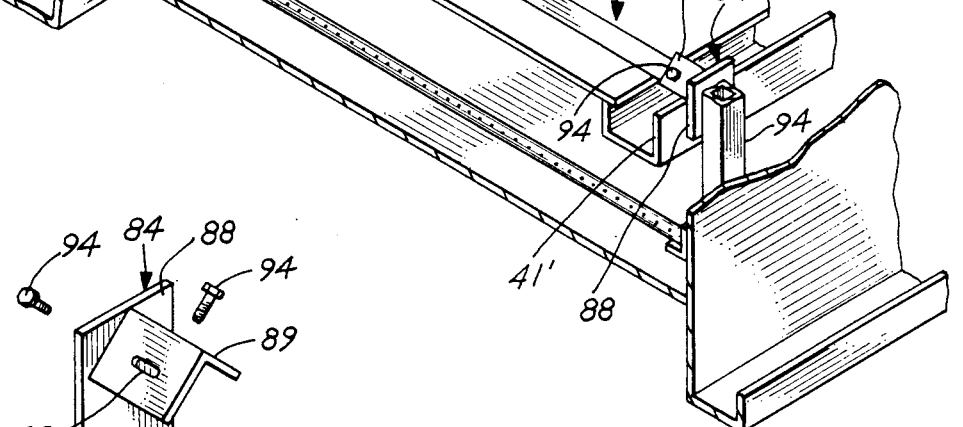
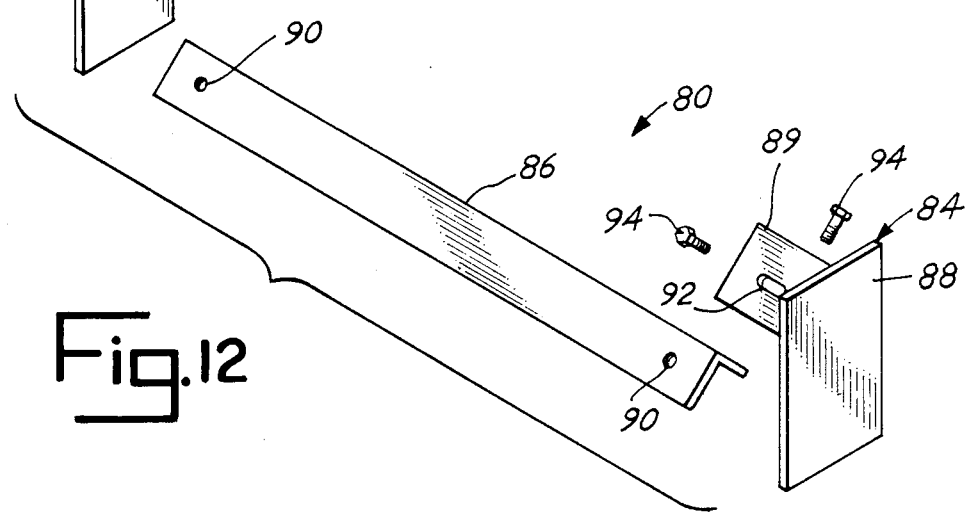
Fig. 12

AUTOMATIC FOOD COOKING MACHINE

RELATED APPLICATION

This is a continuation-in-part of U.S. patent application Ser. No. 343,794 filed Apr. 27, 1989, now U.S. Pat. No. 4,947,741.

FIELD OF THE INVENTION

This invention relates to an automatic food cooking machine.

BACKGROUND OF THE INVENTION

Heretofore, automatic food cooking machines which use a continuous conveyor system for carrying food products, load and unload the food products from the same end. Such food cookers are disclosed in U.S. Pat. Nos. 3,499,380; 2,790,380; and 4,103,606. Such cookers are unacceptable to the U.S. Department of Agriculture (USDA) for cooking food for mass human consumption. The USDA requires that such food be loaded and removed in separate locations by separate personnel. Further, USDA regulations require the food product be protected from direct exposure to the heat source.

A variety of food cookers have been patented in which the food product is loaded at one end and removed at an opposite or remote end. Such cookers are illustrated in U.S. Pat. Nos. 2,238,304; 3,721,178; and 4,188,868. Each of these patents disclose a cooking machine wherein the food is placed on a coveyor, passed over or through a heating element and deposited in an end container. The problem associated with this type of cooker is that the food product makes only one pass over the heat source before exiting the machine. This is unacceptable for the proper preparation of poultry or other meats requiring a longer cooking time.

SUMMARY OF THE INVENTION

The automatic food cooker of this invention eliminates the problems discussed above by providing a cooker which provides access doors located at both ends of a cooker and which has a continuous food product conveyor. The conveyor is oriented such that food product carriers may be attached to the conveyor at one end of the cooker and removed at the other end of the cooker after several rotations of the conveyor within the cooker to assure the food product is properly prepared.

A metal plate extends between the heat source and the conveyor which carries the food product. The plate is angled slightly from front to back so as to cause any drippings from the food product to flow to a collection point at one end of the plate. A plurality of restraining bars may be connected to the cooker to extend over and adjacent the plate. The restraining bars allow the use of a thinner or lighter weight metal plate by minimizing buckling and bending of the plate. Use of a lighter weight plate is often desirable as heat transfer through the plate is increased which would accordingly reduce energy consumed by the cooker. Vent openings are formed in the top of the cooker housing near the cooker doors to allow air to flow into the interior of the cooker and insure proper functioning of the heating elements. By locating the vents near the cooker doors, steam and heat generated within the cooker during operation is vented safely away from the user's body when the doors are opened.

To flavor the food product, a tank containing a basting sauce is positioned near each end of the cooker under the conveyor. The conveyor is arranged so that its carriers enclosed food product are immersed into each tank with every conveyor rotation. The use of two basting tanks enhances the flavor of the food product and also prevents the food product skin from sticking to the carriers.1

Accordingly, it is an object of this invention to provide for a novel automatic food cooker in which the food product is loaded and unloaded at separate ends of the cooker.

Another object of this invention is to provide for an automatic food cooker having vents formed over the cooker doors to provide safe ventilation for the heat and steam within the cooker.

Another object of the invention is to provide a food cooker having a lightweight metal plate positioned between the heat source and food carriers.

Still another object is to provide a food cooker having restaining bars overlying the metal plate to minimize buckling of the plate when heated.

Other objects of this invention will become apparent upon a reading of the following description taken with the accompanying drawings.

BRIEF DESCRIPTION OF THE DRAWINGS

FIG. 3 is a sectional view taken along line 3—3 of FIG. 1.

FIG. 4 is a cross-sectional view taken along line 4—4 of FIG. 3.

FIG. 5 is a fragmented cross-sectional view taken along line 5—5 of FIG. 3.

FIG. 8 is a fragmented sectional view of an alternative cooker embodiment having restraining bars held over a lightweight plate.

FIG. 9 is a fragmented cross-sectional view taken along line 9—9 of FIG. 8.

FIG. 10 is an enlarged view of the circled area of FIG. 8 designated by numeral 90.

FIG. 11 is a fragmented perspective view of the alternative cooker embodiment of FIG. 8.

FIG. 12 is an exploded view of a restraining bar and bracket.

DESCRIPTION OF THE PREFERRED EMBODIMENT

Figure 1:
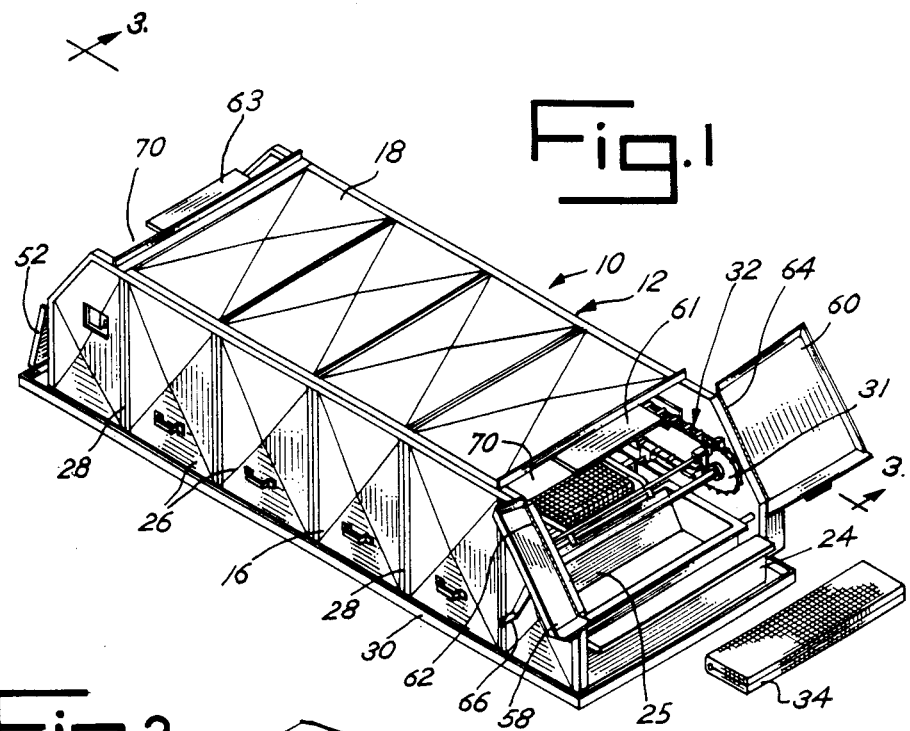
FIG. 1 is a perspective view of the food cooker of this invention.
Figure 2:
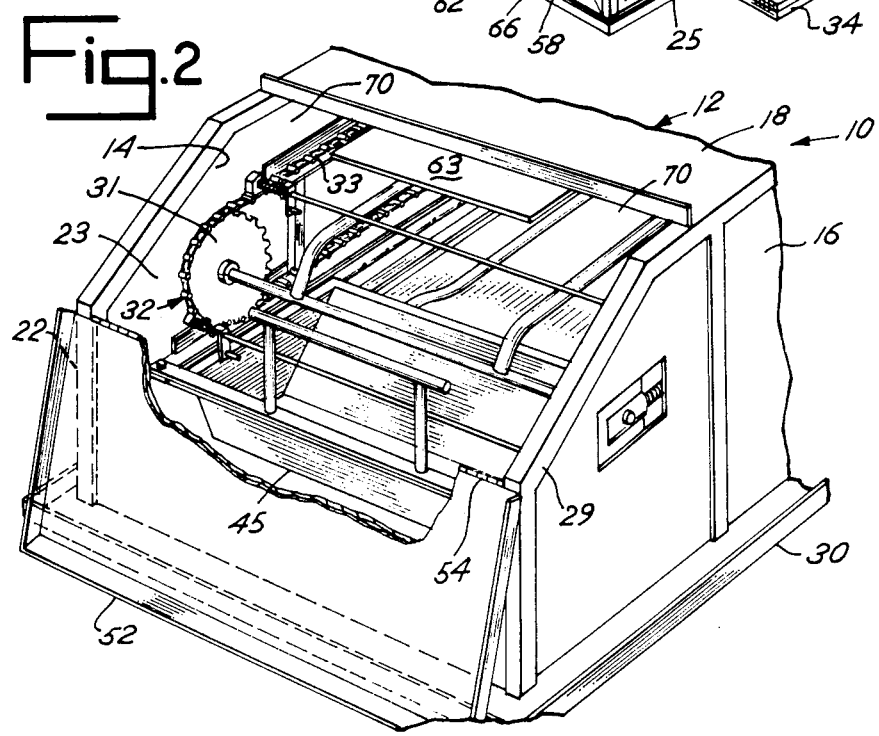
FIG. 2 is a fragmented perspective view of the unloading end of the cooker.

The preferred embodiments herein disclosed are not intended to be exhaustive or to limit the invention to the precise forms disclosed. Rather they are chosen and described to illustrate the principles involved to enable others skilled in the art to utilize their teachings.

Referring now to FIGS. 1-7, automatic food cooker 10 includes a housing 12 having side walls 14, 16 and interconnecting top and bottom walls 18, 20. Housing 12 further includes a removable back end wall 22, and a removable front end wall 24. Side walls 14, 16 include a plurality of panels or gates 26 removably supported by channel members 28. Housing 12 includes a trough-shaped apron 30 which may be supported above the ground or floor by a standard set of legs or frame (not shown).

An endless conveyor 32 extends about sprockets 31 within housing 12. A series of detachable wire mesh food carriers 34 are detachably connected to conveyor runs 33 throughout the interior of the cooker housing 12. A more complete understanding of the construction and operation of conveyor 32 and food product carriers 34 may be had upon a reading of U.S. Pat. No. 3,499,380, issued to Gongwer on Mar. 10, 1978 and incorporated herein by reference.

A heat source such as gas burners 36 are positioned within housing 12 and supported adjacently above housing bottom 20 by brackets 37, 35 as illustrated in the FIGS. 4 and 5. Burners 36 are adapted for connection to a pressurized fuel gas supply (not shown) as is common in the industry.

A metal plate 38 is positioned above burners 36 and supported by brackets 40, 41 connected to housing side walls 14, 16. As illustrated in FIGS. 3-5, plate 38 substantially spans the width and length of housing 12 to separate the food products (not shown) contained in food carriers 34 from the gas flames of burners 36. Plate 38 includes an upwardly angled front end portion 42 which is positioned adjacent to a rear edge of food dip tank 44 as illustrated. Plate 38 is downwardly inclined from its front end portion 42 toward housing back end wall 22 so as to cause food drippings to drain toward the back of cooker 10. A pair of side rails 46 extend the length plate 38 to strengthen the plate against buckling and prevent food drippings from running over the sides of the plate and onto burners 36.

A water conduit 48 having a plurality of small openings is positioned along each side wall 14, 16 of housing 12 and supported above plate 38 by brackets 49 attached to frame 29. Water conduits 48 are adapted to be mutually connected to an external valve and water source (not shown) by conventional connections. Water is sprayed from the conduits upon the hot plate 38 during cooking. This generates steam to moisten the food product within the cooker.

A pair of food product dip tanks 44, 45 are positioned beneath the sprockets 31 of food conveyor 32. As food carriers 34 are pulled around sprockets 31 the food products are immersed in a flavored sauce 47 contained in tanks 44, 45. Tank 45 is slidably supported by brackets 51 on side rails 46 of plate 38 as illustrated best in FIG. 5 and is removable for cleaning. Tank 44 is supported upon transverse rods 53 and is also removable for cleaning.

A rear door 52 is connected by hinge 54 to housing back end wall 22 to close food carrier removal opening 23. Door 52 contacts extension plate 63 when in its closed position of FIGS. 3 and 7.

Side by side front doors 58 and 60 are connected to housing side walls 14, 16 respectively by hinges 62, 64 to close food carrier loading opening 25. Doors 58 and 60 contact extension plate 61 at top 18 of cooker 10 when in their closed position of FIGS. 3 and 6.

Figure 6:
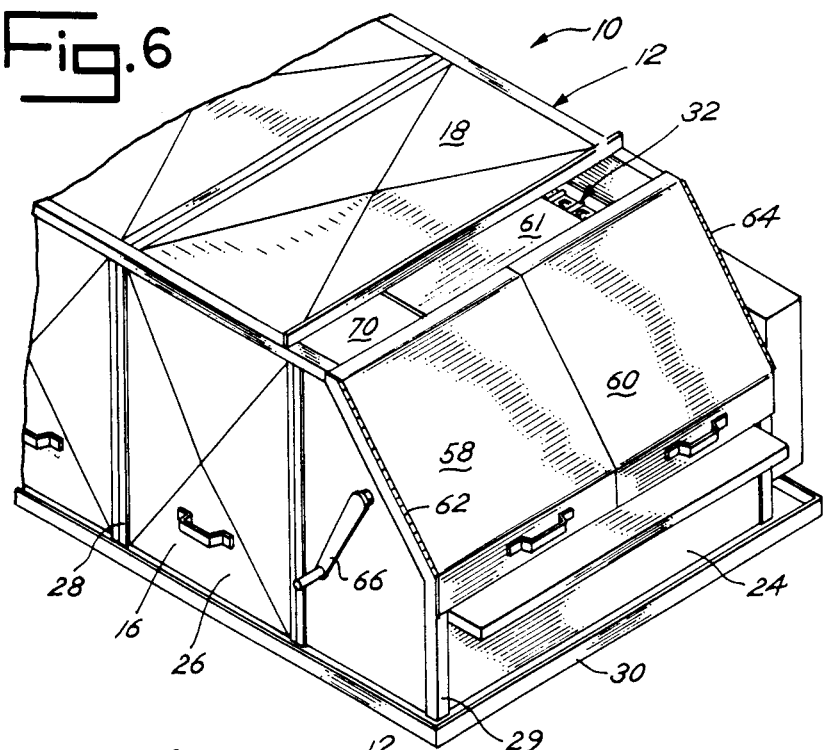
FIG. 6 is a fragmented perspective view of the loading end of the cooker with the doors closed.
Figure 7:
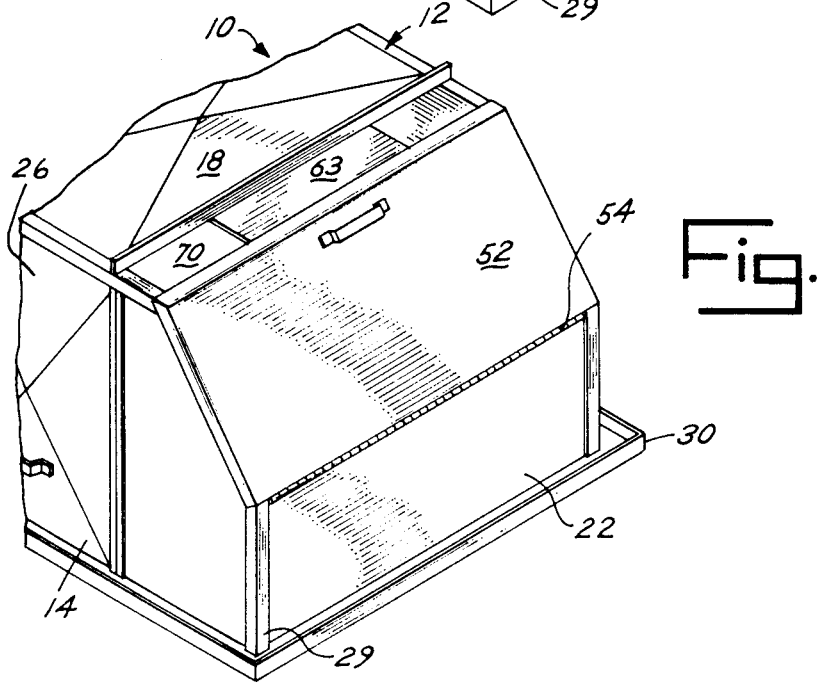
FIG. 7 is a fragmented perspective view of the unloading end of the cooker with the doors closed.

As illustrated in FIGS. 6 and 7, cooker top 18 is inset at each end to provide a vent opening 70 above each of the doors 52, 58 and 60 when closed.

In operation, with dip tanks 44, 45 filled to an appropriate level with sauce 47, burners 36 are connected to an appropriate source of fuel (not shown), water conduits 48 are connected to an appropriate water source (not shown) and the fuel exiting burners 36 is ignited to heat plate 38. As further detailed in incorporated U.S. Pat. No. 3,499,380, a plurality of poultry parts or other food products are loaded into food carriers 34. The loaded carriers 34 are then attached to conveyor 32 through front opening 25 at end 24 of the cooker as the conveyor is manually rotated by handle 66.

After attaching all the food carriers to the conveyor an electric motor (not shown) is actuated to turn sprockets 31. As the food carriers 34 travel along conveyor 32 over sprockets 31, the food is dipped in food tanks 44, 45 to coat the food with sauce 47. By dipping the food products into sauce at each end of conveyor 32 as shown, the flavor of the food product is enhanced. Further, the use of the second dip tank 45 coats the food product sufficiently to prevent the skin from sticking to carriers 34 thus enhancing the aesthetic quality of the food product to a consumer and making cleaning of the food carriers easier.

After the food product is cooked and the electric motor is turned off, door 52 is opened and food carriers 34 are removed from the conveyor 32 through opening 23 at end 22 of cooker 10. The method of attaching and removing carriers 34 to conveyor 32 is detailed in incorporated U.S. Pat. No. 3,499,380.

During cooking of the food product it should be understood that doors 52, 58, 60 are normally in the closed position illustrated in FIG. 3 and are opened only for checking the status of the food product, adding sauce 47 to tanks 44, 45 or loading and removing carriers 34. In this position the internal temperature of the cooker may be better controlled.

Vent openings 70 provide the dual functions of allowing proper ventilation for the heat source and allowing a safe escape of steam and heat away from the user when the doors are opened.

If during cooking the user desires additional moisture, a water valve (not shown) may be opened to spray the heated plate 38 with water to generate steam within the interior of cooker 10. Excess steam and heat exits cooker 10 via vent openings 70. Further any sauce dripping from the food will contact plate 38 and create steam to moisten and add flavor to the food product. Such drippings are confined on plate 38 by side rails 46 and angled end 42.

A second embodiment of the invention is illustrated in FIGS. 8-12. The second embodiment of the invention varies only in the inclusion of restraining bar assemblies 80 and plate 82 which is used as a replacement for plate 38 of FIGS. 1-7. All other component parts and their functions remain constant with the first embodiment and a similar numbering scheme is used wherein a prime number indicates identical form and function between the two embodiments. Therefore the basic cooker construction and operation as previously described need not be reiterated here.

As illustrated in FIGS. 8-12, cooker 10' carries a thin or lightweight metal plate 82 on brackets 40', 41'. Thin metal plate 82 is of a generally lighter metal than plate 38 of the first embodiment and therefore, exhibits greater heat transfer characteristics. However, the thin metal plate 82 under conditions of high heat found in the cooker exhibits a greater tendency to wrap and buckle. Therefore, restraining bar assemblies 80 are included to span the interior of cooker 10' and adjacently overlie thin metal plate 82 to restrict or minimize buckling of the plate.

As illustrated in FIG. 12, a restraining bar assembly 80 includes a pair of brackets 84 in facing alignment and a restraining bar 86. Each bracket 84 includes a generally upright support 88 and an inverted V-shaped arm 89 extending as illustrated from support 88 and connected thereto as by welding. As illustrated bar 86 is also formed in a general inverted V-shape and includes a pair of openings 90 (only one shown) formed near each longitudinal end. Arms 89 includes a pair of slots 92 (only one shown) which align with openings 90 in bar 86. Fasteners 94 traveses slot 92 and opening 90 to secure the bar to the brackets with a nut (not shown).

In use the support 88 of a bracket 84 is connected as by welding to each trough 40', 41' as illustrated and also to the vertical frame supports 94 of the cooker. A pair of brackets 84 are connected to the cooker in alignment and have arms 89 positioned above thin metal plate 82. Bar 86 is connected to brackets 84 by fasteners 94 as mentioned previously. Bar 86 extends traversely across and slightly above thin metal plate 82. In the preferred embodiment, as illustrated, a number of restraining bar assemblies 80 are used within cooker 10' spaced along thin metal plate 82.

To remove thin metal plate 82 from cooker 10' for cleaning or replacement, it is necessary to remove bars 86 from brackets 84 as a typically buckled plate will not slide under bars 86.

Therefore, use of restraining bar assemblies 80 allows the use of a thinner lighter metal plate which improves heat transfer from the heating source. Use of a thinner metal plate promotes energy conservation and lower cooking costs by its improved heat transfer characteristics.

It should be understood that the invention is not limited to the details above but may be modified within the scope of the appended claims.

I claim:

1. An automatic cooking machine having a frame, a housing supported on said frame, said housing having a pair of spaced side walls, an interconnecting top wall and bottom wall, and a pair of end walls, a heating means disposed in said housing for elevating the temperature therein to allow cooking of food products, carrying means disposed in said housing above said heating means for holding food products to be cooked by the heating means, conveyor means disposed in the housing for transporting the carrying means in a spaced relationship over said heating means, said housing having an access opening over said end wall at each end of the housing, a door means connected to said housing adjacent each said access opening for spanning the opening when in a closed position, said heating means includes a plate disposed below said conveyor means and a plurality of gas outlet ports disposed below said plate to radiate heat toward said plate, said plate protecting the outlet ports from drippings falling from said food products and means operatively associated with said plate for limiting disformation of said plate.

2. The automatic cooking machine of claim 1 wherein said limiting means includes a plurality of bars traversely spanning a substantial portion of said cooker housing adjacently overlying said plate, each of said bars being connected to said housing by a pair of brackets connected to said frame.

3. The automatic cooking machine of claim 2 wherein said bars being removably connected to said brackets by fasteners.

4. The automatic cooker of claim 2 wherein said plate is supported in said housing in an angled orientation to facilitate flow of drippings toward an end of said housing.

* * * * *